United States Patent [19]
Manning

[11] 4,186,465
[45] Feb. 5, 1980

[54] SAFETY LOCK

[76] Inventor: Jim L. Manning, P.O. Box 1504, Apache Junction, Ariz. 85220

[21] Appl. No.: 891,133

[22] Filed: Mar. 28, 1978

[51] Int. Cl.² ............................................. A44B 21/00
[52] U.S. Cl. ......................... 24/201 HH; 24/230 AP; 403/340; 403/341
[58] Field of Search ......... 24/201 R, 201 HH, 230 R, 24/230 AP, 230 A; 70/459; 403/339, 340, 341

[56] References Cited
U.S. PATENT DOCUMENTS

| | | | |
|---|---|---|---|
| 266,075 | 10/1882 | Ball | 403/340 |
| 1,856,917 | 5/1932 | Jordan et al. | 403/341 |
| 2,013,283 | 9/1935 | Merrill | 24/201 R |

FOREIGN PATENT DOCUMENTS 98138  3/1923  Switzerland ..................... 24/230 A

*Primary Examiner*—Kenneth J. Dorner
*Attorney, Agent, or Firm*—Gerald L. Moore

[57] ABSTRACT

A lock for joining cables, chains and the like comprising identical parts attached to the cable ends. Each part comprises a hollow cylinder in which is positioned a lever extending lengthwise of the cylinder and attached for limited pivoting action. Each lever end forms a lip which overlaps and interlocks with the lip of the other lever end when the cylinders are butted end-to-end. For disengaging the cylinder ends these levers are pivoted to a nonoverlapping position and the cylinders are pulled apart.

8 Claims, 7 Drawing Figures

SAFETY LOCK

BACKGROUND OF THE INVENTION

For joining the ends of cables and the like there is a need for a secure lock which allows quick and easy engagement and disengagement and yet is relatively simple in design. In addition it is advantageous if such a lock can only be disengaged by special manipulation with the hand or hands such as requiring the use of both hands before disengagement can occur or requiring only the squeezing of a member to allow disengagement such as is necessary in parachute harnesses. It is the primary object of this invention to provide a simple yet secure locking device for cables and chains and the like which can also be adapted for use in special circumstances having high safety requirements.

SUMMARY OF THE INVENTION

A locking device comprising first and second cylindrical sleeves each having center openings in which is positioned a bar member mounted lengthwise therein for limited pivotal action within the sleeve. Each bar member forms a lip near one extending end thereof which overlaps the lip of the other bar member when the sleeves are placed end-to-end. Spring bias means are provided for forcing the bar members into overlapping engagement with the lips interlocked to hold the sleeves together. For releasing the sleeves, the bar members are pivoted out of engagement and the sleeves are pulled apart.

DESCRIPTION OF THE INVENTION

Figure 1:
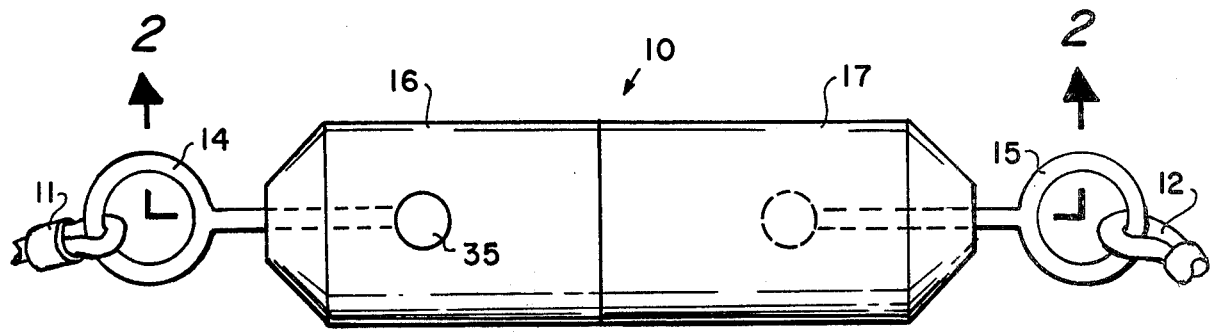
FIG. 1 is a side view of one embodiment of the invention.

In FIG. 1 a lock 10 embodying the subject invention is shown joining the ends of the cables 11 and 12. These cables are looped through eyelets 14 and 15 attached to the lock. In this embodiment the lock comprises identical parts housed in the cylindrical sleeves 16 and 17 each fixed to one of the cable ends. These sleeves are identical and each includes end extensions 16A and 17A, respecively, which overlap so that the sleeves cannot be rotated relative to each other when these ends are butted together. This butting action is necessary for closing the lock.

Figure 3:
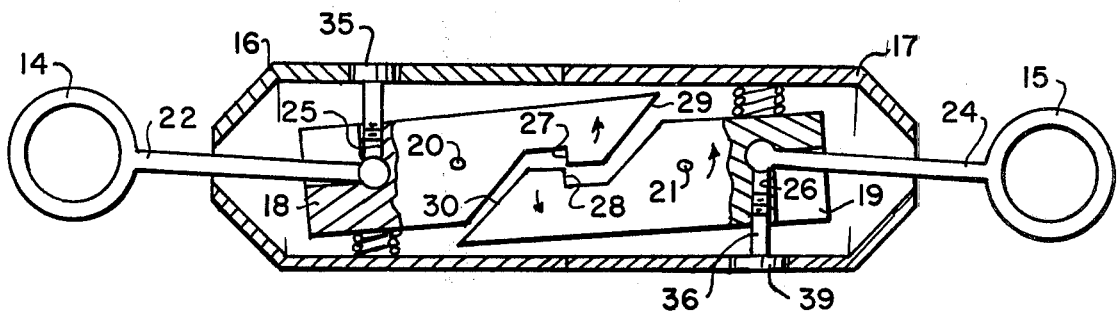
FIG. 3 is similar to FIG. 2 but shows the bar members pivoted to a disengaging position.
Figure 4:
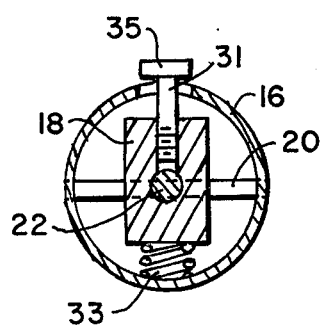
FIG. 4 is a cross-sectional view along the line 4—4 of FIG. 2.

Within the sleeves 16 and 17 are bar members 18 and 19 respectively, pivotally mounted on pins 20 and 21 fixed to opposite sides of the respective sleeves. Thus each bar member is mounted to extend longitudinal of the axis of rotation of the sleeve for limited rotation about the supporting pin in the manner shown in FIG. 3. For attachment of the rings 14 and 15 to the sleeves, rods 22 and 24 extend through openings 25 and 26 in the respective bar members. Thus the pivoting of the bar members is not hindered by attachment to these rod members.

Figure 2:
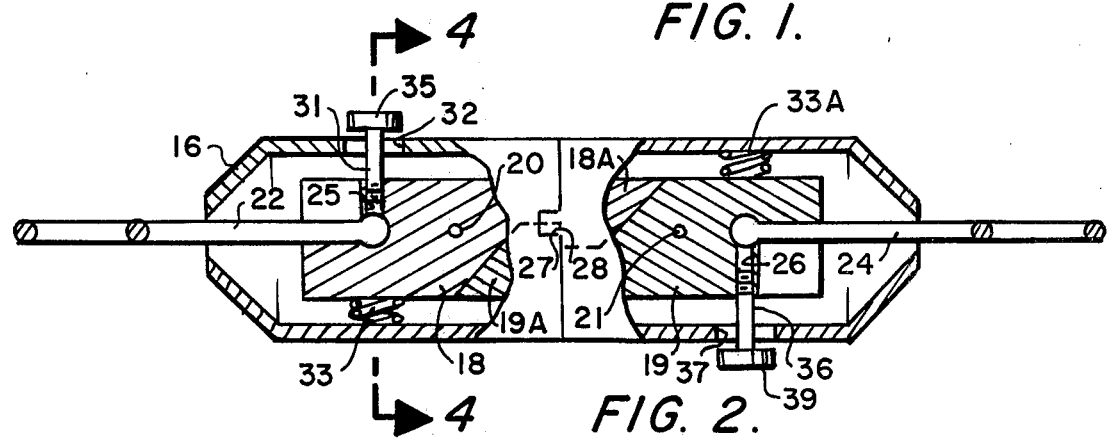
FIG. 2 is a cross-sectional view along the line 2—2 of FIG. 1.

The ends of the bar members 18 and 19 opposite the rods extend beyond the ends of the supporting sleeves 16 and 17, respectively. The bar member 18 includes the extending end 18A having a side cut forming a lip 27. Similarly the bar member 19 has an extending lip 19A forming the lip 28. These lips form surfaces extending perpendicular to the pivoting direction of the respective bar about the supporting pins 20 and 21. Thus the bar members are in the locked position shown in FIG. 2 with the lips overlapping along the longitudinal axes of the members.

The bar members are in the locked position when the lips 27 and 28 overlap and in this position serve to prevent separation of the sleeves 16 and 17. To lock the bar members the sleeves are moved to the position shown in FIG. 3 thereby causing the forward beveled surfaces 29 and 30 to contact and rotate each sleeve in the counterclockwise direction. Such rotation continues until the surfaces 29 and 30 move to a position of nonalignment allowing the bar ends to slide past each other so that the sleeves 16 and 17 can be moved into butting relationship. When in this position the lips 27 and 28 overlap to allow the bar members to pivot in the clockwise direction to a position of alignment of the longitudinal axes for interlocking these lip surfaces.

To maintain the bar members interlocked there is positioned between the bar member 18 and the sleeve a spring 33 tending to rotate the bar member in the clockwise direction. Similarly a spring 33A is positioned between the bar member 19 and the sleeve 17 to rotate that bar member in the clockwise direction. Thus it can be seen that the bars are interlocked by moving the sleeve ends together and causing the bar members to slide past each other as they are slightly rotated within the respective sleeve members until the surfaces 27 and 28 reach a position of alignment. Thereafter the springs 33 and 33A cause these bar members to rotate in the clockwise direction into an abutting relationship with the ends overlapped to hold the sleeves 16 and 17 together. When in this interlocked position pressure on the rings 14 and 15 (as would happen with pulling on the cables 11 and 12 which are attached as shown in FIG. 1) tends to prevent rotation of the bar members and maintain the lock in the locked position. Furthermore relative rotation between the sleeves 16 and 17 is prevented by the overlapping portions 16A and 17A.

To unlock the lock for separation of the sleeves there is provided a pin 31 extending through an opening 32 in the sleeve 16. A pin operator 35 is attached to the outer end of the pin. This pin threads into the threaded opening 25 in the bar member 18 at a point on the opposite side of the supporting pin 20 from the end 18A such that depression of the operator towards the sleeve rotates the bar member in the counterclockwise direction. Such rotation can only occur when sufficient force is exerted on the operator to compress the spring 33 biasing the bar member for rotation in the clockwise direction. Similarly a pin 36 extends through an opening 37 in the sleeve 17 and is threaded into the opening 26 of the bar member 14. By depression of the operator 39 the attached bar member is rotated in the counterclockwise direction with compression of the spring 33A. The pins 31 and 36 also serve to hold the rods 22 and 24 in the bar members 18 and 19.

In the manner previously described there is provided a lock having two identical segments each of which is attached to an end of a chain, cable or other member being joined. The lock segments are interlocked to join the cables by pushing the sleeve ends into a butting relationship such that the bar members overlap and interlock. To subsequently detach the cable ends by unlocking these lock segments, the operators 35 and 39 are pressed into the sleeves. Such action causes rotation of the bar members to a nonoverlapping position. These operators can be placed at positions sufficiently separated so that they cannot both be grasped by the same hand curling around the sleeves. As a result both actuators must be depressed by separate hands before the cable ends are separated. Such a construction provides safety against the lock being released by a child because of the need to use both hands.

By making the surfaces 27 and 28 sufficiently large, rotation of one bar member will not cause these surfaces to disengage but instead, disengagement then requires the rotation of both bar members for sufficient movement to disengage these surfaces. However if desired, the lock can be made so that depression of one operator can cause disengagement of the bar members. Also, one bar member can be stationarily positioned and the other bar member pivoted for locking and unlocking the sleeves. As pointed out before, by the particular location of the attachment of the rods 22 and 24 along the longitudinal axes of the bar members, tension on the rings 14 and 15 tends to prevent rotation of the bar members to hold the bar members in locked engagement. This action provides a further assurance against the accidental unlocking of the lock.

Figure 5:
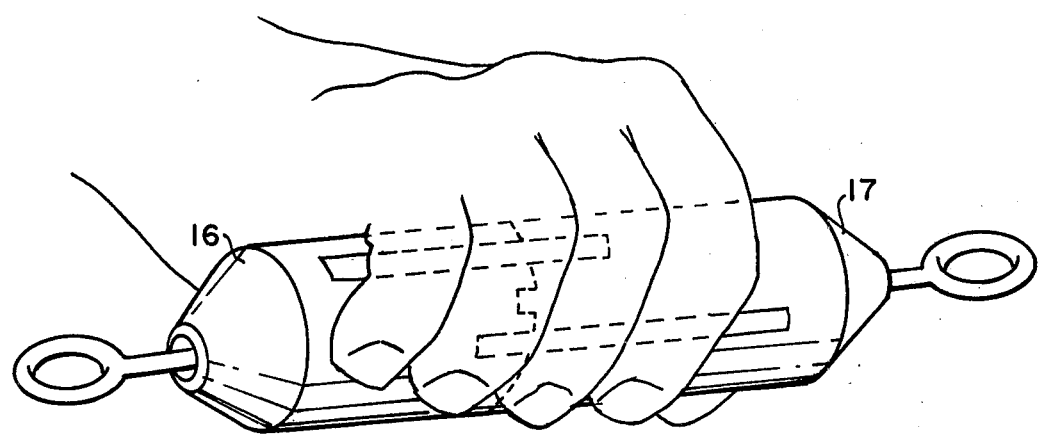
FIG. 5 shows the method of actuation of a second embodiment of the invention.
Figure 6:
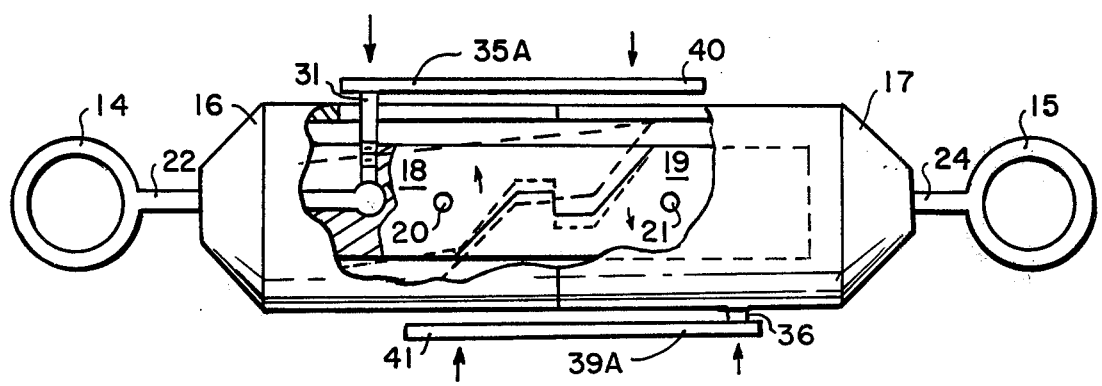
FIG. 6 is a side view partially in cross-section of the embodiment shown in FIG. 5.

Shown in FIGS. 5 and 6 is a second embodiment of the invention also including the sleeve members 16 and 17 in which are mounted identical bar members 18 and 19 as previously described. These bar members are rotated about the pins 20 and 21 and have attached thereto the rods 22 and 24 supporting the rings 14 and 15 for attachment to a cable or strap (not shown). In addition extending through the sleeves are the pins 31 and 36 held in position by the lock washers 34 and 38, respectively.

In this embodiment the operators 35A and 39A include elongated ends 40 and 41, respectively, extending parallel to each sleeve longitudinal axis so as to overlap as viewed from the side in the manner shown in FIG. 6.

Thus as shown in FIG. 5 grasping the lock by one hand allows pressure to be placed on both operators 35A and 39A by simultaneous contact with the ends 40 and 41 such that the lock can be disengaged by movement of the bar members to the unlocked or nonoverlapping position. Such a configuration is important in such uses as for a release for parachute straps wherein unlocking with one hand is important yet positive engagement of the lock for attachment of the strap ends is necessary.

Figure 7:
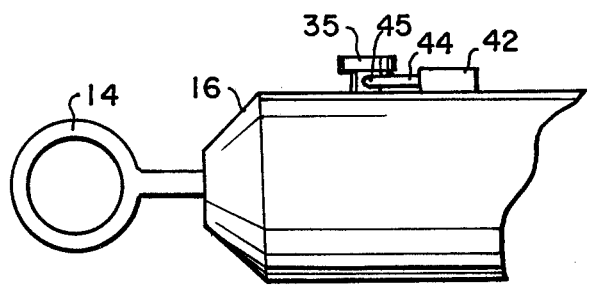
FIG. 7 is a partial view of a third embodiment of the invention showing a lock in place to prevent unauthorized actuation.

Shown in FIG. 7 is another embodiment of the invention wherein the pin 31 extends through the sleeve 16 in the manner previously described. In addition the operator 35 is fixed to the outwardly extending end of this pin. To prevent unauthorized unlocking or disengagement of the lock a second lock 42 including a ring 44 is inserted through a hole 45 in the pin 31 positioned between the operator 35 and the outer surface of the sleeve 16. So long as the lock 42 is in the position shown, the operator cannot be depressed for disengaging the lock.

The invention claimed is:

1. A locking device comprising, in combination first and second sleeves each having center openings extending along a longitudinal axis;
   first and second bar members each having longitudinal axes connecting first and second ends and being positioned within the center openings of said first and second sleeves respectively to extend along the longitudinal axes thereof, the first and second bar members being fastened within the respective sleeves by pivot means permitting pivoting of the bar member within the sleeve;
   each bar member including a lip forming a surface adjacent the first end thereof, said surface being positioned normal to the pivot means and extending laterally of the longitudinal axis of the bar member; and
   a first operator engaging the first bar member and extending external to the associated sleeve for pivoting the bar member about the supporting pivot means whereby the ends of the first and second sleeves adjacent the bar member lips can be placed together and the first bar member pivoted to overlap the lip surfaces and lock the bar members and attached sleeves together.

2. A locking device as defined in claim 1 including a second operator for pivoting the second bar member.

3. A locking device comprising, in combination:
   first and second sleeves each having first ends and having longitudinal axes and center openings extending along these sleeve axes;
   first and second bar members each having a longitudinal axis;
   fastening means mounting each bar member in the respective sleeve with the longitudinal axis thereof coinciding with the longitudinal axis of the sleeve;
   said fastening means for mounting the first and second bar members in the first and second sleeves being a first and second pivot means respectively to allow limited rotation of each said bar member to misalign said bar member longitudinal axis and the respective sleeve longitudinal axis
   a first spring means to bias the first bar member to the position with the longitudinal axis thereof coinciding with the longitudinal axis of the supporting first sleeve;
   a first operator movable for pivoting the first bar member about the first pivot means; and
   each bar member including a lip in one end adjacent each sleeve first end and forming a surface extending normal to the bar member longitudinal axis, whereby by abutting the sleeve first ends the bar ends will overlap and the surfaces thereon will overlap to lock the sleeves together.

4. A locking device as defined in claim 3 including a second operator movable for pivoting said second bar member about the second pivot means.

5. A locking device as defined in claim 4 including a second spring means to bias the second bar member to the position with the longitudinal axis thereof coinciding with the longitudinal axis of the supporting second sleeve.

6. A locking device as defined in claim 5 wherein both first and second operators extend outside the sleeve supporting the associated bar member.

7. A locking device as defined in claim 6 wherein both operators must be moved before the bar member surfaces are moved to a nonoverlapping position.

8. A locking device as defined in claim 5 wherein both bar member ends adjacent the lip are beveled so that contact of these beveled ends will cause the bar members to pivot.

* * * * *